April 21, 1959 G. G. SCARROTT ET AL 2,883,534

DELAY STAGES FOR ELECTRICAL PULSES

Filed Oct. 14, 1955

INVENTORS
Gordon George Scarrott
William John Harwood
Kenneth Charles Johnson
BY Cameron, Kerkam & Sutton
ATTORNEYS United States Patent Office 2,883,534

Patented Apr. 21, 1959

2,883,534

DELAY STAGES FOR ELECTRICAL PULSES

Gordon George Scarrott, Manchester, William John Harwood, Sale, and Kenneth Charles Johnson, Gatley, Cheadle, England, assignors to Ferranti Limited, Hollinwood, Lancashire, England, a company of Great Britain and Northern Ireland Application October 14, 1955, Serial No. 540,572

Claims priority, application Great Britain October 20, 1954

6 Claims. (Cl. 250—27)

This invention relates to delay stages for series trains of electrical pulses. By a "series" train of pulses is meant a train of pulses which exist sequentially in one channel, as opposed a "parallel" train of pulses existing simultaneously in channels individual to each pulse. Such series trains of pulses may represent digital information—for example, in the operation of an electronic computer.

Many kinds of delay stage for series pulse trains are known but in each of them the number of components required per pulse to be delayed is too great for the stage to be economically used where many pulses are contained in the train.

An object of the present invention is to provide a delay stage for a series train of electrical pulses which is economical in components.

In accordance with the present invention, a delay stage for a series train of electrical input pulses comprises a four-arm balanced-bridge network having in one arm an array of resonant circuits tuned to frequencies $f$, $3f$, $5f$, . . . $(2n-1)f$ and in an adjacent arm an array of resonant circuits tuned to frequencies 0, $2f$, $4f$, . . . $2nf$, the other two arms being constituted by impedances, input means for applying each of said input pulses to the common point of an arm containing a said array and an arm containing a said impedance and to the diagonally opposite point of the bridge, and output connections for deriving the delayed pulses from the other two diagonally opposite points of the bridge.

Each or either of said arrays may be a series combination of parallel resonant circuits or a parallel combination of series resonant circuits.

The value of $f$ may be approximately $r/2N$, where $r$ is the repetition frequency of the pulses in said series train and N is the maximum number of pulses to be delayed simultaneously.

The number of resonant circuits in both said arrays taken together may be in the range N to 1.5N inclusive.

In the accompanying drawings.

Figure 1:
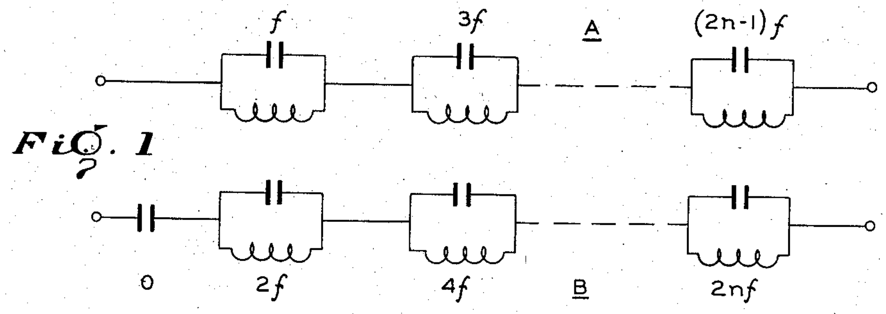
Figures 1 and 2 are schematic diagrams of one embodiment of the invention.

In carrying out the invention in accordance with one form by way of example, a delay stage for a series train of electrical pulses includes a first series combination or array A (see Fig. 1) of $n$ parallel resonant circuits tuned to frequencies $f$, $3f$, $5f$, . . . $(2n-1)f$ cycles per second and a second series array B of $(n+1)$ parallel resonant circuits tuned to frequencies 0, $2f$, $4f$, . . . $2nf$. The zero frequency circuit of array B is in the form of a capacitor. Suitable values for $n$ and $f$ will be discussed later.

Figure 2:
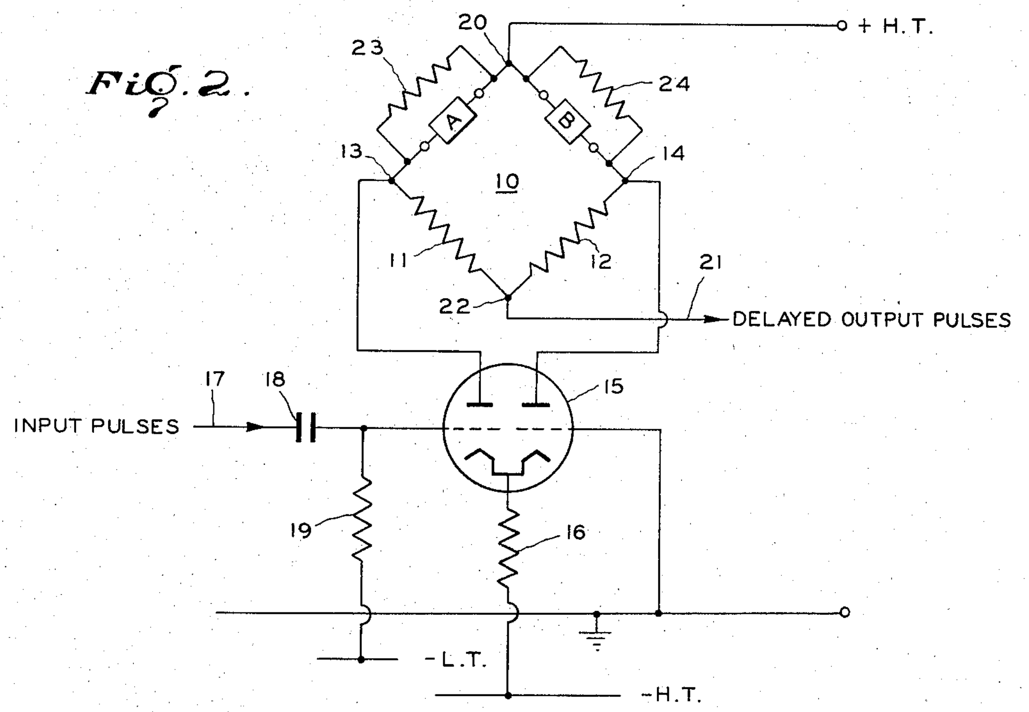

Arrays A and B are connected so as to form adjacent arms of a four-arm balanced-bridge network 10, see Fig. 2, the other two arms of which are formed by high resistors 11 and 12. As is implicit in the term "balanced-bridge," the impedance ratio of resistors 11 and 12, constituting two adjacent arms of network 10, is equal to the ratio of the characteristic impedances of the arrays A and B of resonant circuits constituting the other two arms. The common point 13 of array A and resistor 11 and the diagonally-opposite common point 14 of array B and resistor 12 are connected to the anodes of a duo-triode valve 15. This valve is arranged to act as a paraphase amplifier, i.e., an amplifier which produces two current outputs of opposite phase to one another. Its cathodes are connected through a common resistor 16 to a source of negative high tension. One of the two control grids is earthed. The pulses to be delayed are applied in a positive-going sense to the other control grid by way of a lead 17 and a capacitor 18, this grid being connected to a source of negative low tension by a resistor 19.

Point 20 on the bridge is connected to a source of positive high tension the negative pole of which is earthed. The output from the bridge is derived between points 20 and 22 and is supplied over a lead 21 from the latter point. Resistors 23 and 24 are connected across arrays A and B respectively to absorb the energy of each received pulse. These resistors, together with array A, provide the direct current path from the source to the anodes of valve 15.

In describing the operation it will first be assumed that the capacitive components of the two arrays are all of equal value except those of the zero frequency and $2nf$ circuits, which are twice that value. The effect of stray capacitances and of coil losses will for the present be ignored.

In operation, each input pulse arriving over lead 17 is applied as current pulses in amplified paraphase to the diagonally-opposite points 13 and 14 of the bridge. As all the capacitive elements of arrays A and B are in series all the resonant circuits are thereby excited simultaneously, the respective excitation currents of the two arrays being of opposite senses because of the paraphase feed.

It can be shown (see Proceedings of The Institution of Electrical Engineers, vol. 103, Part B, Supplement No. 3, pages 476–482) that the effect of thus exciting each array is to produce at its terminals an output pulse of effective width $\frac{1}{4}nf$ after a delay $\frac{1}{2}f$, the sense of this output pulse being opposite to that of the input current pulse in the case of array A but the same as that of the input current pulse in the case of array B. As the resonant circuits of both arrays are excited simultaneously by each input pulse, the corresponding output pulses of the two arrays occur simultaneously, since the delay periods are equal. These output pulses are moreover of the same sense as each other; this is due to the fact that, as already explained, one is of the same sense as the input current pulse whereas the other is of opposite sense to the input current pulse.

Owing to the fact that resistors 11 and 12 are balanced, each input pulse applied by the valve to points 13 and 14 produces no potential difference between output points 20 and 22. The output pulses of the two arrays, on the other hand, combine to produce a potential difference between points 20 and 22, and this combined pulse, delivered over lead 21, serves as the required delayed pulse. Accordingly only the delayed pulses, and not the input pulses, are derived over lead 21.

It can also be shown that in the case of each array the response curve crosses the time axis at intervals of $\frac{1}{4}nf$ between each input pulse and the corresponding delayed pulse. Other input pulses may therefore be applied to the stage at these intervals without mutual interference. The maximum number N of pulses that can be delayed simultaneosuly by the stage at this density is $2n$ (the value obtained by dividing the delay period $\frac{1}{2}f$ by the pulse separation period of $\frac{1}{4}nf$). The number of inductors in arrays A and B taken together thus amounts to one per pulse to be delayed.

Given the value of the repetition frequency $r$ of the input pulses we have $r=4nf$. By substituting for $2n$ the number of pulses to be delayed we can obtain the value of $f$.

In the vicinity of each output pulse the undesired peaks of the waveform die away inversely with time. To suppress these peaks more rapidly it may be arranged that the capacitors of the arrays instead of being of equal value increase in capacitance in the higher frequency circuits, the coils of which are modified to tune these circuits to the same resonant frequencies as before. By appropriate choice of capacitors the waveform may be modified as desired whilst maintaining the zero points spaced along the zero axis as before. It is however necessary to increase the number of resonant circuits to delay the same number of pulses as before, the increase being from 1 to about 1.3 circuits per pulse stored. It will be appreciated that even this larger number of circuits results in a very much smaller number of components than in delay stages as hitherto used.

Such stray capacities as arise in practice occur mainly across the coil components of the resonant circuits and across the ends of each array where it is connected to the bridge. The former capacities merely add to those of the tuning capacitors and any distorting effect may be counteracted by appropriate modification of the values of the tuning capacitors.

The stray capacitances across the ends of the arrays may be counteracted by slight adjustment of the tuning of the resonant circuits.

To a first approximation the effect of coil loss is to cause the waveform of each resonant circuit to decay exponentially. If the coils are designed so that the decay of each circuit is similar, each output pulse is built up from components that are equally attenuated. This pulse is therefore of almost the correct shape but reduced in height. To achieve this result the coils are adjusted—by damping, if necessary—so that the Q of each is proportional to its operating frequency. By appropriate choice of damping resistors across the tuned circuits it is also possible to modify the pulse waveform to a desired shape whilst keeping the capacitors of equal value.

Figure 3:
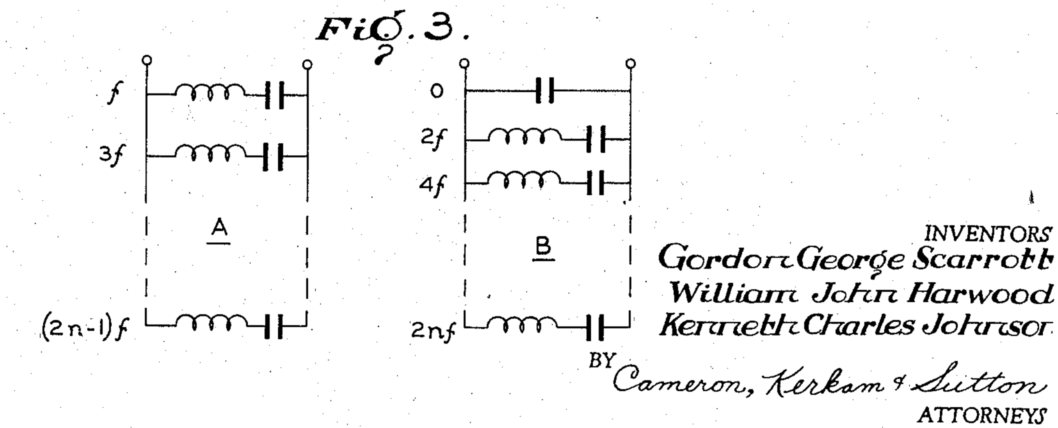
Figure 3 shows a modified form of the apparatus of Figure 1 in accordance with another embodiment.

Details of the delay network above described may be widely varied within the scope of the invention. Each array of resonant circuits may be other than a series combination of parallel resonant circuits. For example, each array may be a parallel combination of series resonant circuits, as shown in Fig. 3.

What we claim is:

1. A delay stage for a series train of electrical input pulses comprising a four-arm balanced-bridge network having two adjacent arms constituted respectively by a first array of resonant circuits tuned to frequencies $f$, $3f$, $5f$, . . . $(2n-1)f$ and a second array comprising a capacitor and a plurality of resonant circuits tuned to frequencies $2f$, $4f$, . . . $2nf$, the other two arms being constituted by impedances the impedance ratio of which is equal to the ratio of the characteristic impedances of said first and second arrays, a paraphase amplifier for applying each of said input pulses as current pulses in paraphase to the common point of an arm containing a said array and an arm containing a said impedance and to the diagonally opposite point of the bridge, and output connections for deriving the delayed pulses from the other two diagonally opposite points of the bridge.

2. A stage as claimed in claim 1 wherein each of said arrays comprises a series combination of parallel resonant circuits.

3. A stage as claimed in claim 1 wherein each of said arrays comprises a parallel combination of series resonant circuits.

4. A stage as claimed in claim 1 wherein said arrays comprise a series combination of parallel resonant circuits and a parallel combination of series resonant circuits respectively.

5. A stage as claimed in claim 1 wherein the value of $f$ is approximately $r/2N$, where $r$ is the repetition frequency of the pulses in said train and N is the maximum number of pulses to be delayed simultaneously.

6. A stage as claimed in claim 5 wherein the number of resonant circuits in both said arrays taken together is in the range N to 1.5N inclusive.

References Cited in the file of this patent

UNITED STATES PATENTS

| | | |
|---|---|---|
| 1,828,454 | Bode | Oct. 20, 1931 |
| 2,678,997 | Darlington | May 18, 1954 |